(12) United States Patent
Koyama

(10) Patent No.: US 7,117,889 B2
(45) Date of Patent: Oct. 10, 2006

(54) THREE-WAY VALVE

(75) Inventor: Katsumi Koyama, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 308 days.

(21) Appl. No.: 10/856,853

(22) Filed: Jun. 1, 2004

(65) Prior Publication Data
US 2004/0244845 A1 Dec. 9, 2004

(30) Foreign Application Priority Data
Jun. 9, 2003 (JP) ............................. 2003-163074

(51) Int. Cl.
*F15B 13/04* (2006.01)
(52) U.S. Cl. ................................. 137/596.15
(58) Field of Classification Search .......... 137/596.15, 137/596.14, 596.16
See application file for complete search history.

(56) References Cited

U.S. PATENT DOCUMENTS

| | | | | |
|---|---|---|---|---|
| 2,878,832 A | * | 3/1959 | Hoge .................... | 137/596.16 |
| 3,175,581 A | * | 3/1965 | Brandenberg et al. . | 137/596.15 |
| 3,194,266 A | * | 7/1965 | Abbott et al. .......... | 137/596.16 |
| 3,536,096 A | * | 10/1970 | Grieger et al. ......... | 137/596.15 |
| 5,588,463 A | * | 12/1996 | Kervagoret ............ | 137/596.15 |
| 6,637,462 B1 | * | 10/2003 | Foster et al. ............. | 137/627.5 |

FOREIGN PATENT DOCUMENTS

| | | |
|---|---|---|
| CH | 652 181 | 10/1985 |
| DE | 1 917 499 | 10/1970 |
| GB | 789 241 | 1/1958 |
| JP | 5-64582 | 8/1993 |

* cited by examiner

*Primary Examiner*—Eric Keasel
*Assistant Examiner*—Craig Schneider
(74) *Attorney, Agent, or Firm*—Westerman, Hattori, Daniels & Adrian, LLP.

(57) ABSTRACT

The object of the present invention is to provide a three-way valve reduced in the number of component parts and man-hours for assembling the component parts. A pressure chamber of a piston for urging a first main valve in a valve-closing direction by a spring, and a pressure chamber of a piston for urging a second main valve in a valve-opening direction against the urging force of a spring are connected to a medium-pressure port B via a pilot valve and a pressure passage. When the pilot valve is open, the pressure in the pressure chambers into which high-pressure fluid is introduced from a high-pressure port A via an orifice is permitted to escape to the medium-pressure port B, whereby the piston is pushed upward by the high pressure to open the first main valve, and a plug is urged by the spring to close the second main valve. When the pilot valve is closed, the pressure in the pressure chambers becomes high, so that the piston is pushed downward by the spring to close the first main valve, and the piston is pushed downward by the high pressure to open the second main valve. Since the pilot valve is formed by a two-way solenoid valve, and the pressure passage is formed within a body, it is possible to reduce the number of component parts.

3 Claims, 4 Drawing Sheets

THREE-WAY VALVE

CROSS-REFERENCES TO RELATED APPLICATIONS, IF ANY

This application claims priority of Japanese Application No. 2003-163074 filed on Jun. 9, 2003 and entitled "THREE-WAY VALVE".

BACKGROUND OF THE INVENTION (1) Field of the Invention

The present invention relates to a three-way valve, and more particularly to a three-way valve that includes the three ports of a high-pressure port, a medium-pressure port, and a low-pressure port, and performs switching between a flow path causing the fluid to flow from the high-pressure port to the medium-pressure port and a flow path causing the fluid to flow from the medium-pressure port to the low-pressure port.

(2) Description of the Related Art

The three-way valve includes a type that utilizes the pressure of fluid introduced therein, for switching operation of a main valve thereof. The three-way valve of this type includes a valve element for selectively opening and closing a passage between a first port and a second port of three ports, and a passage between the second port and a third port of the same, and pistons for driving the valve element in valve-opening and valve-closing directions, respectively, such that the pressure of upstream-side fluid is introduced into a pressure chamber of one of the pistons, while the pressure of a pressure chamber of the other of the pistons is released, to thereby cause the pistons to actuate the valve element for opening and closing operations. To switch the pressure chamber of each piston between a state connected to the high-pressure side and a state connected to the low-pressure side, a solenoid-operated pilot valve is used. This pilot valve has a three-way valve structure and introduces or releases pressure into or from the pressure chamber of the associated piston by energization or deenergization of a solenoid thereof. For the pilot valves provided in the three-way valve, pressure passages for connecting between the upstream side of the three-way valve, the pressure chambers of the pistons, and the low-pressure side of the three-way valve are formed by capillary tubes or the like (Japanese Laid-Open Utility Model Publication (Kokai) No. H05-64582 (drain passages 29 and 30 in FIG. 1)).

In the conventional three-way valve, however, it is necessary to form the pressure passages for switching the pressure in each of the pressure chambers of the pistons e.g. by capillary tubes, and further each pilot valve has a three-way valve structure. This increases the number of component parts and man-hours for assembling the component parts.

SUMMARY OF THE INVENTION

The present invention has been made in view of the above points, and an object thereof is to provide a three-way valve reduced in the number of component parts and man-hours for assembling the component parts.

To solve the above problem, the present invention provides a three-way valve for switching between a first state in which fluid is caused to flow from a high-pressure port to a medium-pressure port, and a second state in which the fluid is caused to flow from the medium-pressure port to a low-pressure port, the three-way valve comprising a first main valve including a first valve element disposed such that the first valve element can move to and away from a first valve seat formed in a passage between the high-pressure port and the medium-pressure port, on an upstream side thereof, a first piston having a first pressure chamber into which the fluid is introduced from the high-pressure port via an orifice, on a side of the first piston opposite to a side thereof where the first piston is coupled to the first valve element, and a first spring urging the first valve element in a valve-closing direction, a second main valve including a second valve element disposed such that the second valve element can move to and away from a second valve seat formed in a passage between the medium-pressure port and the low-pressure port, on an upstream side thereof, a second piston having a second pressure chamber communicating with the first pressure chamber, on a side of the second piston opposite to a side thereof where the second valve element is in abutment therewith via a valve hole of the second valve seat, and a second spring urging the second valve element in a valve-closing direction, and a pilot valve for controlling a pressure passage formed in a body accommodating the first and second main valves, for communication between the first pressure chamber and the medium-pressure port, by a solenoid force thereof, such that the communication is established or blocked.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereafter, preferred embodiments of the present invention will be described with reference to the drawings.

Figure 1:
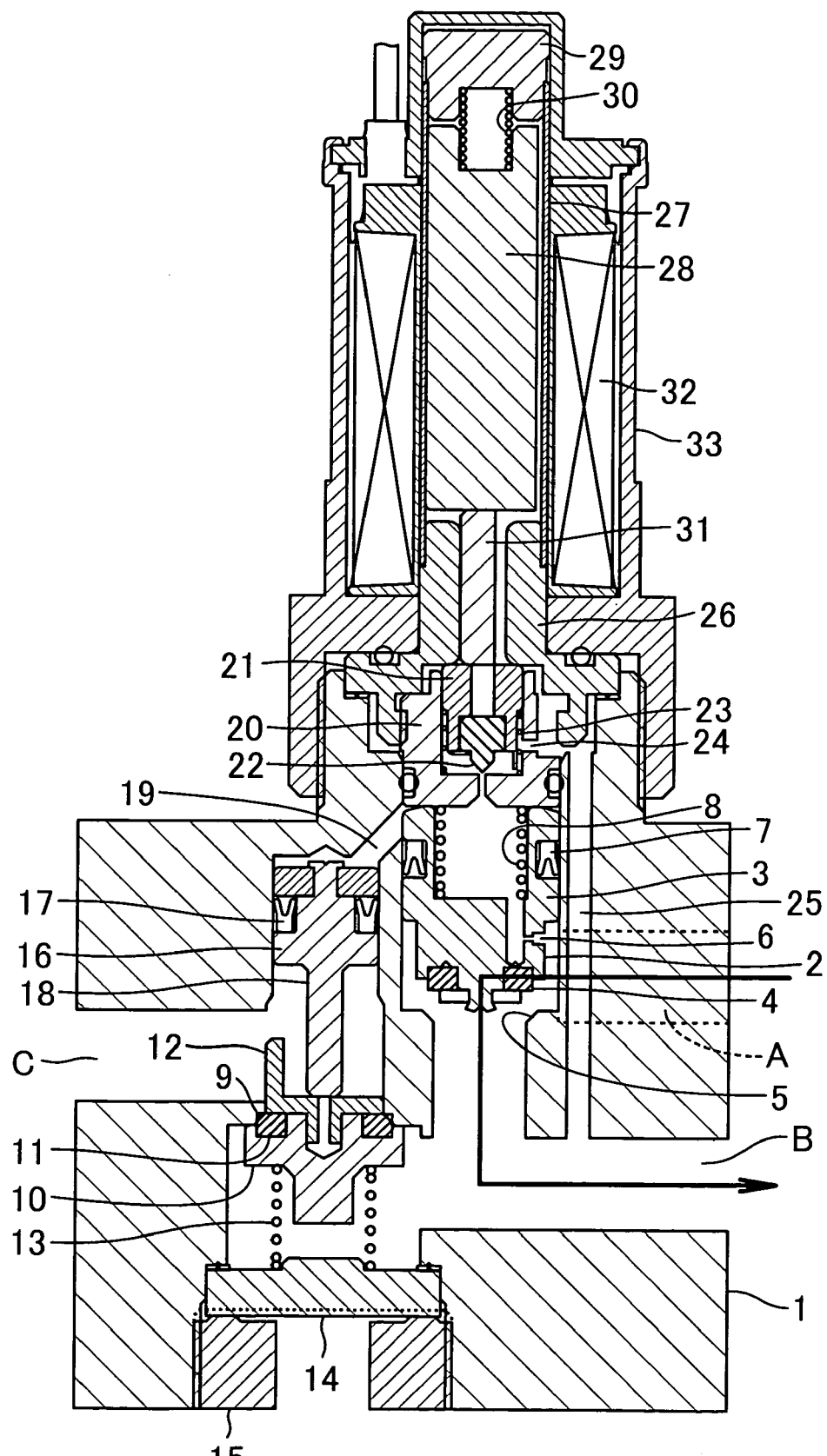
FIG. 1 is a central longitudinal cross-sectional view showing a three-way valve according to a first embodiment of the invention, in the OFF state of a solenoid.
Figure 2:
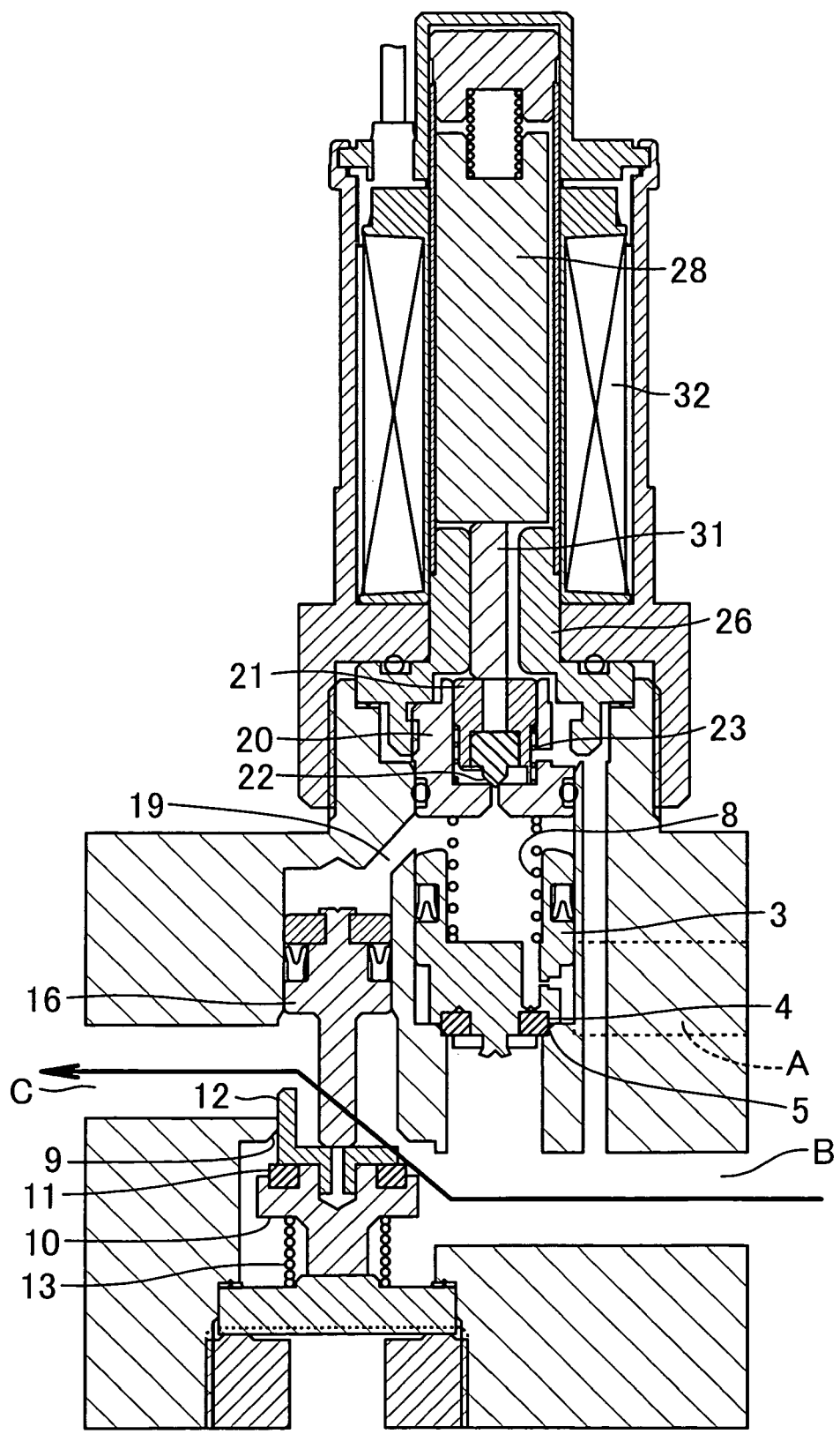
FIG. 2 is a central longitudinal cross-sectional view showing the three-way valve according to the first embodiment, in the ON state of the solenoid.

FIG. 1 is a central longitudinal cross-sectional view showing a three-way valve according to a first embodiment in the OFF state of a solenoid. FIG. 2 is a central longitudinal cross-sectional view showing the three-way valve according to the first embodiment in the ON state of the solenoid.

The three-way valve includes a high-pressure port A through which high-pressure fluid is caused to flow into a body 1, a medium-pressure port B through which the fluid is caused to flow out as medium-pressure fluid or medium-pressure fluid is caused to flow in, by switching of the three-way valve, and a low-pressure port C through which the fluid is caused to flow out as low-pressure fluid. The body 1 has a cylinder formed to extend from above as viewed in the figures such that it communicates with the high-pressure port A formed to extend from a side thereof. The cylinder contains a plug 2 and a piston 3 integrally formed with each other and arranged in a manner vertically movable as viewed in the figures. An annular valve sheet 4 made of a resilient material and forming a valve element is rigidly fixed to a lower end of the plug 2, and a valve seat 5 is integrally formed with the body 1 in a passage communicating with the medium-pressure port B in a manner opposed to the annular valve sheet 4. The valve sheet 4 fixed to the plug 2 and the valve seat 5 integrally formed with the body 1 form a first main valve of the present three-way valve. The piston 3 has a recess formed in an upper central portion thereof as viewed in the figures so as to define a pressure chamber therein, and an orifice 6 is formed such that the pressure chamber and the high-pressure port A communicate with each other. Furthermore, the piston 3 has a groove circumferentially formed in an outer periphery thereof and a V packing 7 fitted in the groove, for preventing leakage of fluid from a sliding portion of the piston 3. Further, the pressure chamber of the piston 3 accommodates a spring 8 urging the plug 2 and the piston 3 from above as viewed in the figures in the direction of seating the valve sheet 4 on the valve seat 5.

The body 1 also has a cylinder formed to extend from below as viewed in the figures such that the cylinder communicates with the medium-pressure port B and the low-pressure port C both formed to extend from sides thereof. Between the medium-pressure port B and the low-pressure port C is a valve seat 9 integrally formed with the body 1, and a plug 10 is disposed in a manner opposed to the valve seat 9 on the side of the medium-pressure port B such that the plug 10 can move to and away from the valve seat 9. The plug 10 holds an annular valve sheet 11 made of a resilient material and forming a valve element, and the valve sheet 11 and the valve seat 9 integrally formed with the body 1 form a second main valve of the present three-way valve. The plug 10 is coupled to a guide 12 disposed within the cylinder such that the guide 12 holds the valve sheet 11, and guided by the guide 12 in a manner vertically movable as viewed in the figures. The plug 10 is urged by a spring 13 from below as viewed in the figures in the direction of seating the valve sheet 11 on the valve seat 9. An end of the spring 13, on a side opposite to the plug 10, is received by a closing member 14 closing an opening of the cylinder. The closing member 14 is pressed against the body 1 via a gasket by a screw 15 screwed into the opening of the cylinder, such that the opening of the cylinder is fluidtightly closed. In an upper portion of the cylinder as viewed in the figures, a piston 16 is disposed in a manner vertically movable as viewed in the figures. The piston 16 has a V packing 17 disposed around the periphery thereof, for preventing leakage of fluid from a sliding portion thereof, and is integrally formed with a shaft 18 extending toward the guide 12 along a central axis thereof. A pressure chamber above the piston 16 as viewed in the figures communicates with the pressure chamber of the piston 3 of the first main valve via a passage 19.

The cylinder opening in the top of the body 1 is provided with a pilot valve formed by a two-way solenoid valve. This pilot valve includes a hollow portion that opens upward as viewed in the figures, and a valve seat-forming member 20 formed with a valve hole forming an inlet port of the two-way solenoid valve in the center of a lower end of the pilot valve as viewed in the figures. The valve seat-forming member 20 is fitted in the cylinder at a location above the piston 3 as viewed in the figures, and receives the spring 8 urging the first main valve in the valve-closing direction at a face thereof toward the piston 3. A holder 21 is disposed in a hollow portion of the valve seat-forming member 20, in a vertically movable manner as viewed in the figures. The holder 21 holds a valve element 22 on a side thereof opposed to the valve hole of the valve seat-forming member 20, and is urged by a spring 23 in a direction in which the valve element 22 is moved away from the valve hole. Further, the valve seat-forming member 20 has a side wall formed therethrough with a passage 24 forming an outlet port of the two-way solenoid valve. The passage 24 communicates with the medium-pressure port B via a pressure passage 25 formed in the body 1.

The pilot valve has a core 26 a lower end of which, as viewed in the figures, is screwed onto an outer peripheral portion of the valve seat-forming member 20, and an upper end of which is fitted in a sleeve 27. The sleeve 27 has a plunger 28 disposed therein in a vertically movable manner as viewed in the figures. The plunger 28 is urged downward as viewed in the figures, by a spring 30 disposed between the plunger 28 and a plug 29 closing an upper opening of the sleeve 27. Between the plunger 28 and the holder 21, there is disposed a shaft 31 extending through the core 26. A coil 32 is circumferentially arranged outside the sleeve 27, and further surrounded by a casing 33 forming a yoke, a lower end of which is screwed onto the body 1. It should be noted that the spring 23 urging the holder 21 toward the core 26 is set to have a stronger spring force than that of the spring 30 urging the plunger 28 toward the core 26, and hence when the coil 32 is not energized, the holder 21 is in abutment with the core 26, whereby the plunger 28 is spaced away from the core 26 by the shaft 31.

In the three-way valve constructed as above, when the pilot valve is not energized, i.e. when its solenoid is off, no attractive force is generated between the plunger 28 and the core 26, so that as shown in FIG. 1, the pilot valve is open to make the pressure chamber of the piston 3 of the first main valve open to the medium-pressure port B via the pilot valve and the pressure passage 25.

Now, when fluid is introduced into the high-pressure port A, the fluid pushes the piston 3 upward to open the first main valve. At this time, the high-pressure refrigerant is introduced into the pressure chamber via the orifice 6. However, since the pressure chamber communicates with the medium-pressure port B, a state is maintained in which the pressure on the lower side of the piston 3 as viewed in the figures is constantly held high, and the pressure on the upper side of the piston 3 as viewed in the figures is constantly held medium, i.e. lower than the high pressure due to pressure loss caused by flow of the fluid passing through the first main valve. This causes the first main valve to maintain its valve-open state. On the other hand, the medium-pressure port B is held at medium-pressure close to the high pressure, and the low-pressure port C is held at low pressure sufficiently lower than the medium-pressure, so that the second main valve is closed by the differential pressure between these pressures. At this time, the piston 16 positioned on the same axis as that of the second main valve is about to be pushed downward due to medium pressure in the pressure chamber above the piston 16 as viewed in the figures and the low pressure on the lower side of the piston 16 as viewed in the figures. However, the piston 16 has an effective pressure-receiving area smaller than that of the plug 10, and the upward urging force of the spring 13 is applied to the piston 16, so that the force received from the plug 10 for pushing upward the piston 16 is larger than the force applied thereto for pushing the same downward. Thus, as indicated by an arrow in FIG. 1, the fluid caused to flow into the high-pressure port A flows out from the medium-pressure port B through the first main valve.

Then, when the coil 32 is energized to turn on the solenoid, as shown in FIG. 2, the plunger 28 is attracted toward the core 26 against the urging force of the spring 23 within the valve seat-forming member 20, so that the plunger 28 pushes the holder 21 downward via the shaft 31, whereby the valve element 22 closes the valve hole of the valve seat-forming member 20. As a result, the pressure in the pressure chamber of the piston 3 is increased to become equal to the pressure on the lower side of the piston 3. Therefore, the piston 3 is pushed downward as viewed in FIG. 2, by the urging force of the spring 8, which causes the valve sheet 4 to be seated on the valve seat 5 to thereby close the first main valve. At this time, the pressure in the pressure chamber above the piston 16 becomes equal to the high pressure of the pressure chamber in the piston 3 via the passage 19, and hence the piston 16 overcomes the urging force of the spring 13 to push downward the guide 12 and the plug 10. This causes the valve sheet 11 held by the plug 10 to be moved away from the valve seat 9 to open the second main valve. Consequently, the fluid flowing into the medium-pressure port B flows out from the low-pressure port C through the second main valve, as indicated by an arrow in FIG. 2.

Figure 3:
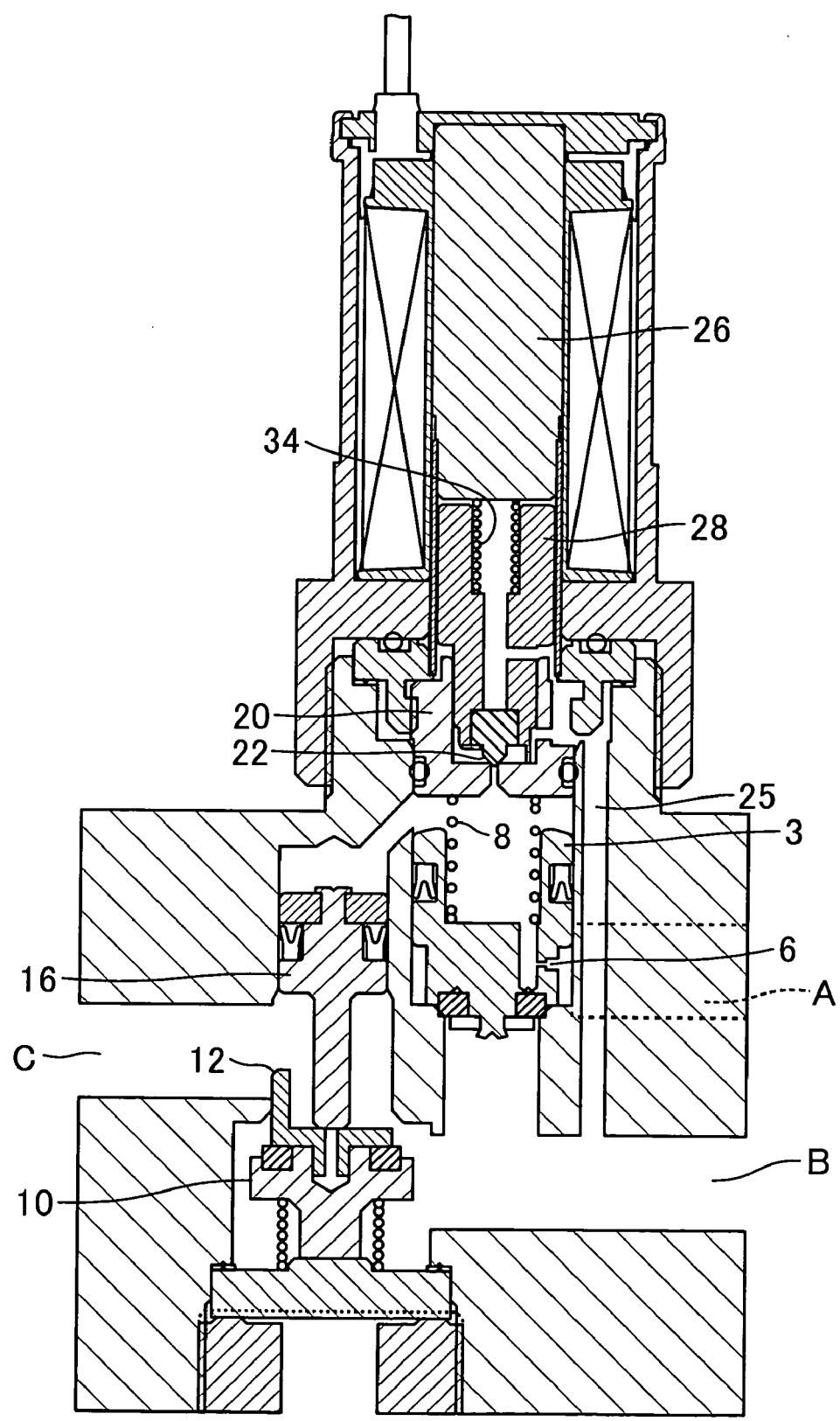
FIG. 3 is a central longitudinal cross-sectional view showing a three-way valve according to a second embodiment of the invention, in the OFF state of a solenoid.
Figure 4:
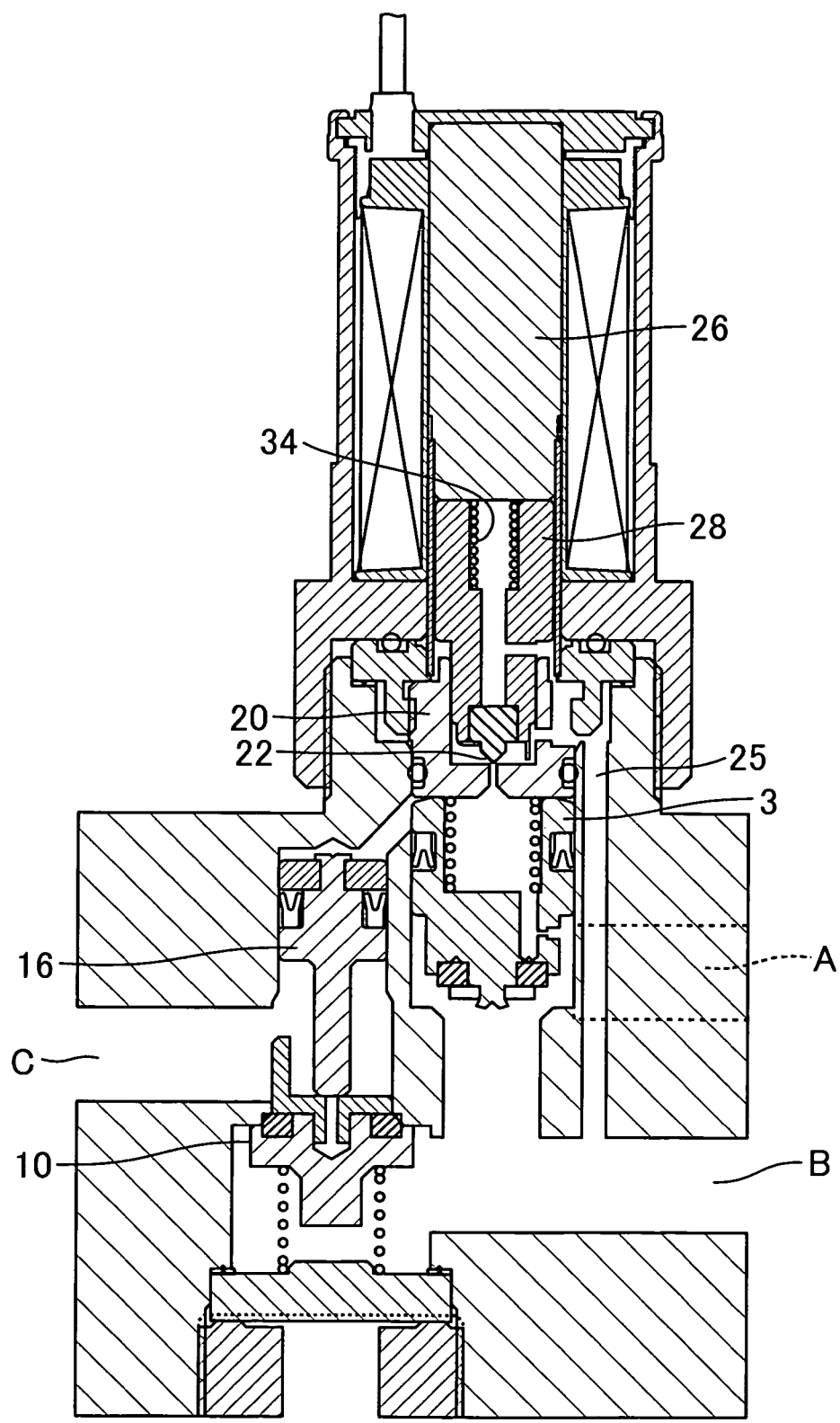
FIG. 4 is a central longitudinal cross-sectional view showing the three-way valve according to the second embodiment, in the ON state of the solenoid.

FIG. 3 is a central longitudinal cross-sectional view showing a three-way valve according to a second embodiment, in the OFF state of an solenoid. FIG. 4 is a central longitudinal cross-sectional view showing the three-way valve according to the second embodiment, in the ON state of the solenoid. It should be noted that in FIG. 3 and FIG. 4, component elements identical or equivalent to those shown in FIG. 1 and FIG. 2 are designated by the same reference numerals, and detailed description thereof is omitted.

In three-way valve according to the first embodiment, when the solenoid is off, the three-way valve establishes communication between the high-pressure port A and the medium-pressure port B and blocks communication between the medium-pressure port B and the low-pressure port C, whereas in the three-way valve according to the second embodiment, when the solenoid is off, the three-way valve blocks the communication between the high-pressure port A and the medium-pressure port B and establishes the communication between the medium-pressure port B and the low-pressure port C. Therefore, the three-way valve according to the second embodiment is identical in construction to the three-way valve according to the first embodiment as to the first and second main valves, but distinguished therefrom only as to the construction of the pilot valve.

More specifically, the pilot valve is configured to have a plunger 28 disposed toward a valve seat-forming member 20 to thereby reverse the positional relationship between the plunger 28 and a core 26. Disposed between the core 26 and the plunger 28 is a spring 34, and the plunger 28 holds a valve element 22 at a lower end thereof opposed to a valve hole of the valve seat-forming member 20. Further, the plunger 28 is formed with a pressure-equalizing hole for communication between a gap between the same and the core 26, and a pressure passage 25.

In the three-way valve constructed as above, when the pilot valve is not energized, i.e. when its solenoid is off, the plunger 28 is urged by the spring 34 in a direction away from the core 26, so that as shown in FIG. 3, the pilot valve is in its valve-closed state and a pressure chamber of a piston 3 of a first main valve is closed by the pilot valve.

Now, when fluid is introduced into the high-pressure port A, the pressure chamber of the piston 3 and a pressure chamber above a piston 16 are closed by the pilot valve, so that they are filled with high pressure introduced via an orifice 6 of the piston 3. This makes pressure on the upper side of the piston 3 and pressure on the lower side of the same equal to each other, so that the piston 3 is pushed downward by the urging force of a spring 8, to thereby close the first main valve. At this time, the high pressure is blocked by the first main valve to increase pressure in the pressure chamber above the piston 16, whereby the piston 16 is pushed downward, and hence a guide 12 and a plug 10 as well are pushed downward to open the second main valve. This causes the fluid flowing into the medium-pressure port B to flow out from the low-pressure port C through the second main valve.

Then, when the solenoid is turned on, as shown in FIG. 4, the plunger 28 is attracted by the core 26 against the urging force of the spring 34, so that the valve element 22 held by the plunger 28 is moved away from the valve hole of the valve seat-forming member 20 to thereby open the pilot valve. Consequently, the pressure chamber of the piston 3 and the pressure chamber above the piston 16 communicate with the medium-pressure port B via the pilot valve and the pressure passage 25, so that the piston 3 is pushed upward by the high pressure to open the first main valve. This makes the pressure in the medium-pressure port B a medium pressure close to the high pressure, whereby the plug 10 is pushed upward to close the second main valve. As a result, the fluid flowing into the high-pressure port A flows out from the medium-pressure port B through the first main valve.

The present invention has been described above based on the three-way valve that closes the pressure passage 25 when the pilot valve is not energized, and opens the pressure passage 25 when the pilot valve is energized, and the three-way valve that closes the pressure passage 25 when the pilot valve is energized, and opens the pressure passage 25 when the pilot valve is not energized. The two types of three-way valves are selectively employed as required according to systems in which they are incorporated.

As described heretofore, according to the present invention, the three-way valve is configured such that a pressure chamber of a piston that is formed with an orifice for introducing high-pressure fluid and urges a first main valve in a valve-closing direction and a pressure chamber of a piston that urges a second main valve in a valve-opening direction are connected to a medium-pressure port via a pilot valve formed by a two-way solenoid valve and a pressure passage formed in a body, and the pilot valve is opened or closed to thereby place the tree-way valve in a first state in which the fluid is caused to flow from a high-pressure port to the medium-pressure port via the first main valve, or a second state in which the fluid is caused to flow from the medium-pressure port to a low-pressure port via the second main valve. Thus, the pressure passage is formed in the body for permitting pressures of the pressure chambers of the pistons to escape, so that external capillary tubes can be dispensed with to reduce the number of component parts and man-hours for assembling the component parts, and it is possible to form a three-way valve smaller in size. Further, since the pilot valve is formed by a two-way solenoid valve, it is also possible to reduce the number of component parts and man-hours for assembling the component parts, thereby making it possible to form a three-way valve at a lower cost.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A three-way valve for switching between a first state in which fluid is caused to flow from a high-pressure port to a medium-pressure port, and a second state in which the fluid is caused to flow from the medium-pressure port to a low-pressure port, the three-way valve comprising:

a first main valve including a first valve element disposed such that the first valve element can move to and away from a first valve seat formed in a passage between the high-pressure port and the medium-pressure port, on an upstream side thereof, a first piston having a first pressure chamber into which the fluid is introduced from the high-pressure port via an orifice, on a side of the first piston opposite to a side thereof where the first piston is coupled to the first valve element, a first spring urges the first valve element in a valve-closing direction;

a second main valve including a second valve element disposed such that the second valve element can move to and away from a second valve seat formed in a passage between the medium-pressure port and the low-pressure port, on an upstream side thereof, a second piston having a second pressure chamber communicating with the first pressure chamber, on a side of the second piston opposite to a side thereof where the second valve element is in abutment therewith via a valve hole of the second valve seat, and a second spring urging the second valve element in a valve-closing direction; and a pilot valve for controlling a pressure passage formed in a body accommodating the first and second main valves, for communication between the first pressure chamber and the medium-pressure port, by a solenoid force thereof, such that the communication is established or blocked.

2. The three-way valve according to claim 1, wherein the first valve element and the second valve element have valve sheets made of a resilient material, fixed to respective portions thereof via which the first valve element and the second valve element are seated on the first valve seat and the second valve seat.

3. The three-way valve according to claim 1, wherein the first piston and the second piston have respective sliding portions thereof sealed by sealing members.

* * * * *